(12) United States Patent
Burkhardt

(10) Patent No.: US 12,351,140 B1
(45) Date of Patent: Jul. 8, 2025

(54) CRANK SLEEVE

(71) Applicant: Daniel George Burkhardt, Cincinnati, OH (US)

(72) Inventor: Daniel George Burkhardt, Cincinnati, OH (US)

( * ) Notice: Subject to any disclaimer, the term of this patent is extended or adjusted under 35 U.S.C. 154(b) by 307 days.

(21) Appl. No.: 17/954,261

(22) Filed: Sep. 27, 2022

Related U.S. Application Data

(60) Provisional application No. 63/248,923, filed on Sep. 27, 2021.

(51) Int. Cl.
*B60S 9/04* (2006.01)

(52) U.S. Cl.
CPC ...................... *B60S 9/04* (2013.01)

(58) Field of Classification Search
CPC .............. B60S 9/04; B25F 3/00; G05G 1/085
See application file for complete search history.

(56) References Cited

U.S. PATENT DOCUMENTS

| | | | | |
|---|---|---|---|---|
| 6,010,154 A | * | 1/2000 | Payne | B60S 9/08 81/176.15 |
| 6,846,016 B2 | | 1/2005 | VanDenberg et al. | |
| 7,303,210 B2 | | 12/2007 | Baxter et al. | |
| 8,590,417 B1 | | 11/2013 | Bono et al. | |
| 8,820,714 B2 | * | 9/2014 | Shih | B66F 3/12 254/126 |
| 10,464,193 B2 | | 11/2019 | Chen et al. | |
| 10,661,763 B2 | | 5/2020 | Hart | |
| 2005/0109996 A1 | * | 5/2005 | Razzaghi | B66F 3/44 254/126 |
| 2007/0257243 A1 | * | 11/2007 | Cofer | G05G 1/085 254/419 |
| 2008/0315570 A1 | | 12/2008 | Baxter | |
| 2020/0326743 A1 | * | 10/2020 | Palermo, Jr. | B60D 1/465 |
| 2020/0377062 A1 | * | 12/2020 | Beik | B60S 9/06 |
| 2022/0169211 A1 | * | 6/2022 | Bedel | B60S 9/08 |

* cited by examiner

*Primary Examiner* — Seahee Hong
(74) *Attorney, Agent, or Firm* — Daniel F. Nesbitt; Nesbitt IP LLC

(57) ABSTRACT

A crank sleeve having a first open-sided hollow cylinder having an open slot extending along its length, and a second open-sided hollow cylinder having an open slot extending along its length and fixed at a right angle to a second end of the second hollow cylinder to provide a continuous open slot from an open first end of the first hollow cylinder to an open second end of the second hollow cylinder. The crank sleeve is attached to the curved crank of a landing gear assembly. A drive means is formed at the second end of the first hollow cylinder. An operator can operate a powered hand drill attached to a driving end of the drive means to rotate the crank sleeve and the crank captured therein, to extend or retract the landing legs of the landing gear assembly.

6 Claims, 8 Drawing Sheets

CRANK SLEEVE

CROSS-REFERENCE TO RELATED APPLICATION

The present application claims the benefit of U.S. Provisional Application Ser. No. 63/248,923 filed Sep. 27, 2021, the disclosure of which is hereby incorporated by reference in its entirety.

BACKGROUND OF THE INVENTION

The trucking industry is a vital pillar of the economy in the United States, and in many other countries. By some estimates, trucking is responsible for moving 70% of all freight in the United States, and 80% c of US communities depend on trucks for the delivery of everyday goods, spanning from raw materials, food, medicine, and much more. Truck drivers that operate vehicles are typically on driving duty for long hours and often on a daily basis. Truck drivers must meet certain physical requirements, and some requirements, depending on the individual trucking company: have good vision and adequate hearing, and not have high blood pressure, or epilepsy, or be under the influence of alcohol or other drugs. The long hours spent sitting in one place, the irregular hours, and the need to eat wherever and whenever you can, are issues that can raise health problems for many truck drivers. The physical demands on a truck driver are also significant, so time and labor-saving features and processes are vitally important.

One very important, time-consuming, and physically strenuous tasks for a truck driver is the unloading of an existing trailer, and the loading a trailer to a new trailer, to the coupling of the hauling truck vehicle. The front end of a trailer includes a landing gear assembly that includes a pair of telescoping legs, a landing gear drive shaft, and a crank-operated mechanical gearing. The telescoping legs are configured to be extended and retracted vertically by a crank-operated mechanical gearing, to engage the feet of the telescoping legs with the ground. The feet of the telescoping legs can be lowered from the landing gear assembly by rotating the crank in a first, typically clockwise, direction, until the feet engage the ground, and can be raised by rotating the crank in the opposite, typically counterclockwise, direction, until the feet have been raised off the ground and the telescoping legs have been drawn upwardly into the landing gear assembly. The crank is typically a step-shaped pipe, having a three tube sections, with a hinge section having a pivoting hinge at one end to engage the crank-operated mechanical gearing of the landing gear assembly, an arm section that extends at a right angle from the opposite end of the hinge section, and a handle section that extends at a right angle from the distal end of the arm section, and extends parallel to the hinge section. The crank is typically a single length of tubing that is bent into the shape of the step. The operator rotates the handle section of the crank with one hand, while stabilizing the hinge section with the other hand.

U.S. Pat. No. 8,590,417 B1 (Bono), the disclosure of which is incorporated by reference in its entirety, discloses a trailer landing gear apparatus for rotating a drive shaft of a landing gear or lifting gear of a land vehicle. A drive shaft connector can be attachable to a trailer drive shaft. A drive gear apparatus may be mounted on a rotary drive apparatus and a drive apparatus connector may be attached to a drive socket of the drive gear apparatus. The drive shaft can be rotated by positioning the drive apparatus connector on a connector shaft of the drive shaft connector. The rotary drive apparatus can then be operated to rotate the gear elements of the drive gear apparatus to rotate the drive shaft connector. The drive shaft connector can also have a hand crank handle attached to a sleeve for alternate use in drive shaft rotation.

U.S. Pat. No. 10,464,193 (Chen), the disclosure of which is incorporated by reference in its entirety, discloses a semi-trailer landing gear apparatus employing a handheld power tool, attached to a standard landing gear drive shaft. The landing gear apparatus includes a slip collar drive that allows an operator to use the power tool without removing the hand crank. The power tool has a locking blade which slides into or otherwise engages with a trailer-mounted bracket or bracket mounted on a telescoping arm when the coupler is engaged, preventing rotational movement against the opera-tor as the motor is activated. The power tool also has a quick-release socket assembly that readily connects and disconnects the power tool from the apparatus. A planetary gear system is employed for gear reduction within the power tool.

U.S. Pat. No. 10,661,763 B2 (Hart), the disclosure of which is incorporated by reference in its entirety, describes an apparatus that provides rotational power to the crank shaft to actuate the lowering and raising of legs for supporting a load-bearing vehicle. The apparatus comprises a battery powered motorized drill having a drive shaft having a plurality of rotational directions, a motor housing, and a crank shaft coupler adapted for removable attachment to the crank shaft that comprises an adaptor end having a non-round cross-section, and an attachment end defining a cavity snugly accepting the crank shaft and including a pair of apertures aligned with a transverse bore through the crank shaft through which a lock pin is inserted. A means is provided for preventing rotation comprising a bridge between said motor housing and the load bearing vehicle, said housing including at least one lateral handle having a distal end supporting a bridge arm for contacting the load bearing vehicle and preventing rotation of said drill.

A need remains for a device to assist the driver in raising and lowering of the telescoping legs of a landing gear assembly for a commercial or recreational vehicle, for example, a truck trailer.

SUMMARY OF THE INVENTION

The present invention provides a crank sleeve that can be applied to, and preferably secured to, a crank of a landing gear assembly, and more particularly to both the hinge section and the arm section of the crank. The crank sleeve includes a first open-sided member having an enveloping wall that surrounds the hinge section of the crank on at least three sides of the hinge section, and a second open-sided member that is attached securely to a distal end of the first open-sided member, extending from the first open-sided member at about a right angle. The respective enveloping walls of the first and second open-sided members are contiguous, and the open-side and interior of the first open-sided member is continuous and in open communication with the open-side and interior of the second open-sided member. The crank sleeve includes a means for restraining, and preferably securing, the crank sleeve to the crank sections, during operation.

The crank sleeve also includes a drive means for rotating the crank sleeve around a drive axis that extends along the length of and within the enveloping wall of the first open-sided member. The drive axis is configured to extend co-axially with the landing gear drive shaft. The drive means includes a shank that extends outwardly along the drive axis, for engaging a powered drill, typically a battery-powered or compressed-air-powered hand-held drill (powered hand drill), for rotatively driving the drive means and the crank sleeve, and thereby, the crank.

In an embodiment, a crank sleeve 20, includes: —a first open-sided hollow cylinder 30 having a length, an open first end 36, and a second distal end 37, and having an open slot 35 extending from the open first end 36 along the length toward the second distal end 37, and having an axis 101 along the length, and—a second open-sided hollow cylinder 40 having a length, an open first end 46, and a second end 47, and having an open slot 45 extending from the open first end 46 along the length toward the second end 47, the first end 46 of the second open-sided cylinder 40 fixed at a right angle to the first open-sided hollow cylinder 30, to provide a continuous open slot 25 from the open first end 36 of the first open-sided hollow cylinder 30 to the open second end 47 of the second open-sided hollow cylinder 40. The crank sleeve 20 can also include a drive port 39 formed at the second distal end 37 of, and having an axis parallel to the axis 101 of, the first open-sided hollow cylinder 30, and configured for inserting therein a drive shank 70 that extends along the axis 101 of the first open-sided hollow cylinder 30.

In another embodiment, a crank sleeve 120, includes:—a first open-sided hollow cylinder 130 having a length, an open first end, and a second distal end, and having an open slot extending from the open first end along the length toward the second distal end, and having an axis along the length, and—a second open-sided hollow cylinder 140 having a length, an open first end, and an open second end, and having an open slot extending from the open first end along the length to the open second end, the open first end of the second open-sided hollow cylinder 140 fixed a right angle to the first open-sided hollow cylinder 130, to provide a continuous open slot from the open first end of the first open-sided hollow cylinder 130 to the open second end of the second open-sided hollow cylinder 140. The crank sleeve can also include a drive shank fixed at the second end of, and extending along the axis of, the first open-sided hollow cylinder 130.

In various embodiments, the hollow cylinders can be square cylinders with at least one wall removed, or a circular cylinder with a chord portion of the cylinder wall removed.

A function of the crank sleeve is to transfer the torque delivered by a powered hand drill, typically a battery-powered or compressed-air-powered hand-held drill, to rotatively drive the landing gear drive shaft to extend and retract the legs of a landing gear assembly. The first and second open-sided hollow cylinders of the crank sleeve envelope the hinge and arm sections of a crank. The powered hand drill rotates a drive shank that is either integrate into or secured to the crank sleeve, to revolve the crank sleeve around an axis. The axis extends along an axis of the first open-sided hollow cylinder of the crank sleeve that extends within and along the open slot of the crank sleeve. When the crank sleeve is attached and secured to the crank, the revolving of the crank sleeve revolves the crank around the axis to either extend or retract the telescoping legs.

The material of the crank shield should be inflexible and non-resilient under operating conditions. The material can be selected from the group consisting of a plastic (a thermoplastic or thermoset resin), fiberglass and composites thereof, and a metal or alloy thereof. Non-limiting examples of a metal are steel and aluminum. Preferably, the material is mild or low carbon steel, formed and welded together by conventional means and methods.

The crank sleeve of the invention can be used to operate a landing gear assembly for any commercial or recreational vehicle, for example, a truck trailer, a recreational vehicle (RV), and a flat-bed trailer.

DETAILED DESCRIPTION THE INVENTION

Figure 1:
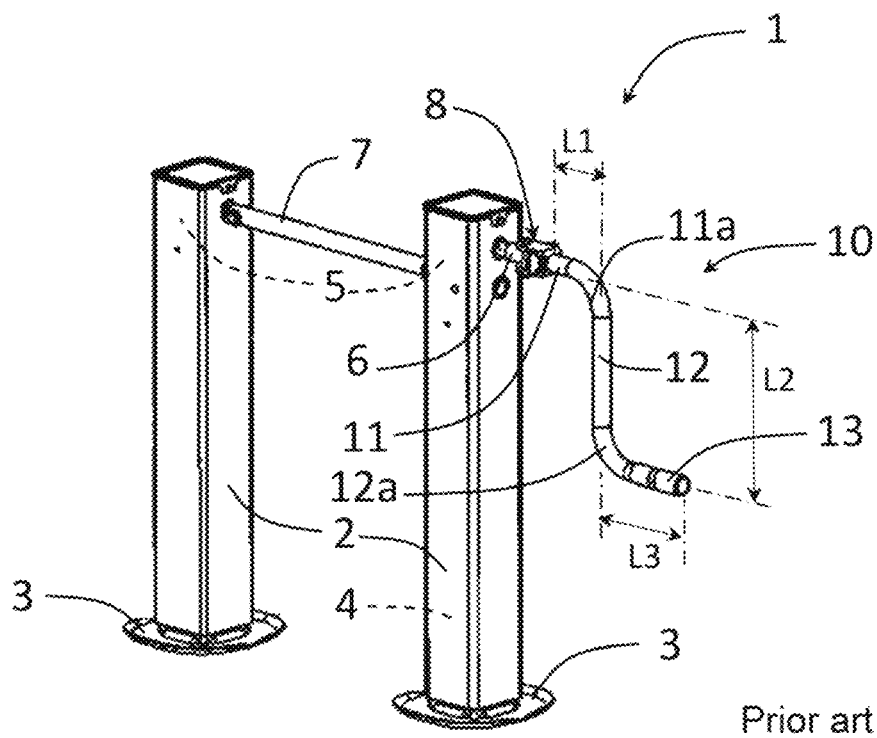
FIG. 1 shows a perspective view of a landing gear assembly operable with a manual crank.
Figure 2:
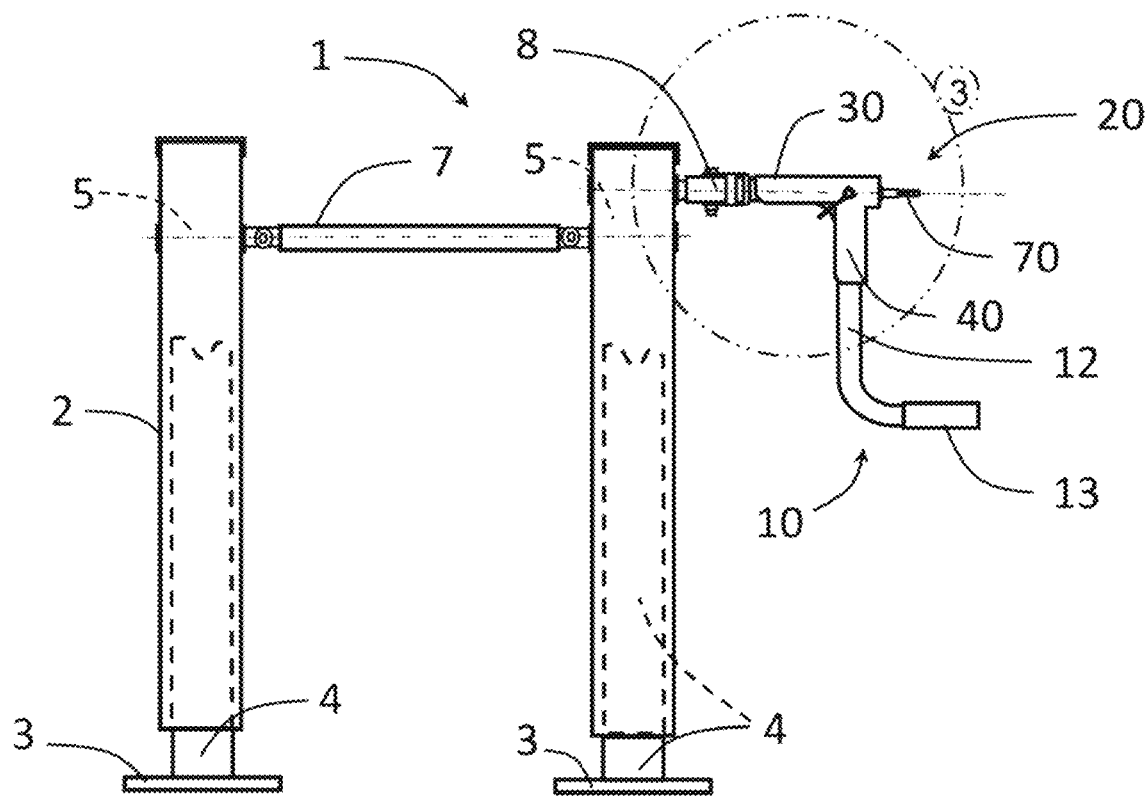
FIG. 2 shows an elevation view of a landing gear assembly and a crank sleeve of the present invention.
Figure 3:
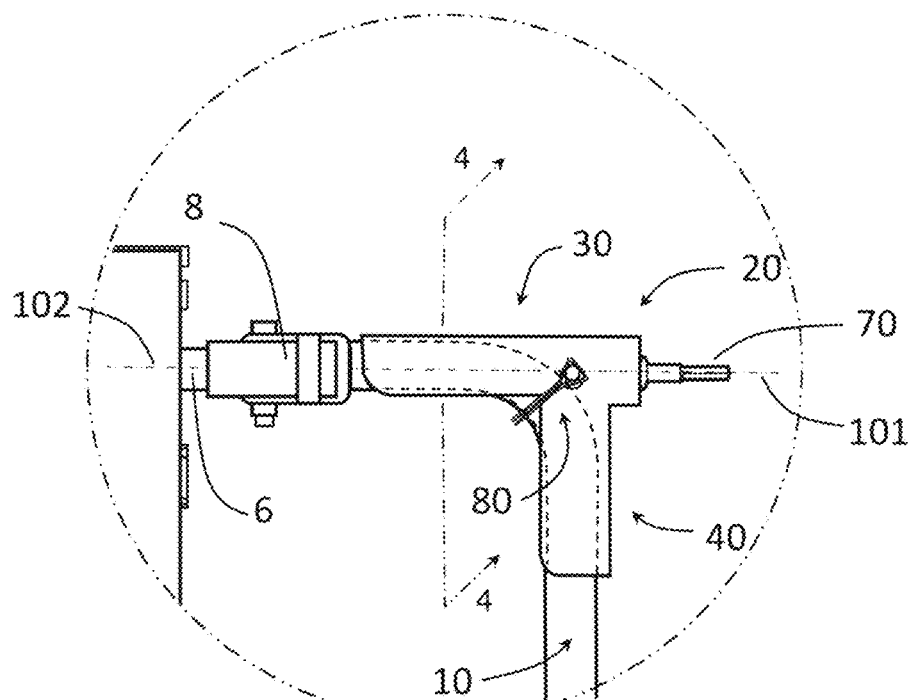
FIG. 3 shows a detailed view of the crank and the crank sleeve shown in FIG. 2.

A landing gear assembly 1 is shown in FIGS. 1-3. The landing gear assembly 1 includes, inter alia, a pair of telescoping legs 4, a landing gear drive shaft 6, and a crank-operated mechanical gearing. The crank-operated mechanical gearing 5 (no illustrated) is housed within the respective upper portions of a pair of leg supports 2, to convert rotation of the landing gear drive shaft 6 into corresponding rotation of a connecting rod 7 that extends between the respective mechanical gearing 5, and into respective extending (or retracting) of the telescoping legs 4 within the leg supports 2. The telescoping legs 4 are extended and retracted vertically by a crank-operated mechanical gearing 5, to engage the feet 3 of the telescoping legs 4 with the ground. The feet 3 and telescoping legs 4 are shown in FIG. 1 as fully retracted into the leg supports 2, and in FIG. 2 as partly extended from the leg supports 2. The feet 3 of the telescoping legs 4 can be lowered from the landing gear assembly 1 by rotating the crank 10 in a first, typically clockwise, direction, until the feet 3 engage the ground, and can be raised by rotating the crank in the opposite, typically counter-clockwise, direction, until the feet 3 have been raised off the ground and the telescoping legs 4 have been drawn upwardly into the leg supports 2 of the landing gear assembly 1. A non-limiting example of a crank is described in U.S. Pat. No. 7,303,210, the disclosure of which is incorporated by reference in its entirety.

The crank 10 is typically a step-shaped pipe or tubing, having three tube sections. A hinge section 11 has a pivoting hinge 8 at one end, which is coupled to the landing gear drive shaft 6 of the landing gear assembly 1, and extends to a distal end, illustrated as a curved joint 11*a*. The length L1 of the hinge section 11 is typically about 4-6 inches, from the pivoting hinge 8 to a centerline of an arm section 12. The arm section 12 extends at a right angle, typically from the curved joint 11*a* at the opposite end of the hinge section 11, to a distal end, illustrated as a curved joint 12*a*. The length L2 of the arm section 12 is typically about 8-18 inches, from a centerline of the hinge section 11 to a centerline of handle section 13. The handle section 13 extends at a right angle from the arm section 12, and parallel to the hinge section 11. The length L3 of the handle section 13 is typically about 6-8 inches, from a centerline of the arm section 12 to a distal end of the handle section 13. The crank 10 is typically a single length of tubing that is bent into the shape of the step, and typically with curved portions at the right-angle joints between the hinge section 11 and the arm section 12, and between the arm section 12 and the handle section 13. The tube sections or tubing typically have a total length of about 18-30 inches, and an outside diameter of about ½ inch to 4 inch. An operator can manually operate the landing gear assembly by rotating the handle section 13 of the crank 10 with one hand, while stabilizing the hinge section 11 with the other hand. Non-limiting examples of a landing gear assembly are described in U.S. Pat. No. 6,846,016 (Van-Denberg), U.S. Pat. No. 10,464,193 (Chen) and US Patent Application Publication 2008/0315570 A1 (Baxter), the disclosures of which are incorporated by reference in their entireties.

FIGS. 2 and 3 also shows the landing gear assembly 1 with a crank sleeve 20 of the present invention. The crank sleeve 20 includes a horizontal segment and a vertical segment, and a drive means. The horizontal segment is illustrated as a first open-sided hollow cylinder 30 and the vertical segment is illustrated as a second open-sided hollow cylinder 50 that extends from a distal end of the first open-sided hollow cylinder 30. A drive shank 70 extends axially from the distal end of the first open-sided hollow cylinder 30.

Figure 4:
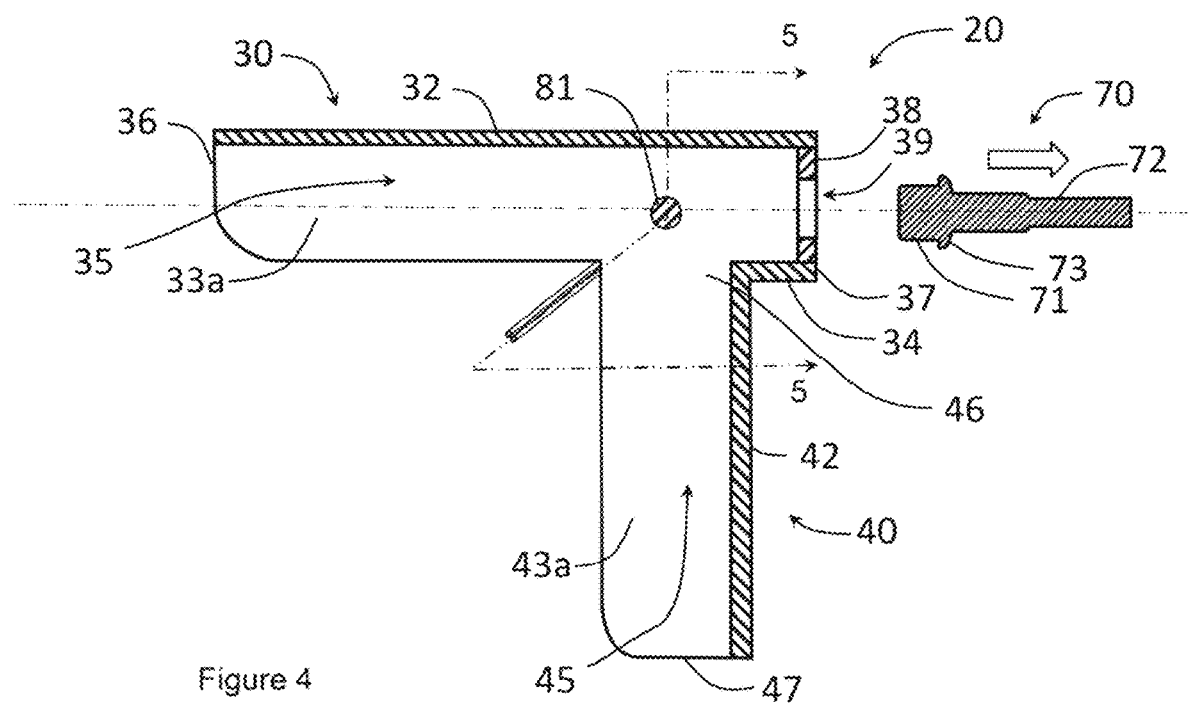
FIG. 4 shows a longitudinal section view of the crank sleeve of FIG. 3.

FIG. 4 shows a sectional view of the crank sleeve 20. The first open-sided hollow cylinder 30 is a four-sided square cylinder having an upper wall 32 and opposed sidewalls 33*a* and 33*b*, with the under-side wall removed from the open first end 36 toward the second distal end 37 that leaves a lower fourth-wall portion 34 at the distal end 37. The removed portion of the square cylinder leaves an open slot 35 extending from the open first end 36 to the fourth-wall portion 34 at the distal end 37. When the crank sleeve 20 is placed onto the crank 10, the first open-sided hollow cylinder 30 envelopes the horizontal hinge section 11 of the crank 10, with the opposed sidewalls 33*a* and 33*b* disposed on opposite lateral sides of the hinge section 11, and the upper side of the hinge section 11 confronting the upper wall 32.

The second open-sided hollow cylinder 40 is a four-sided square cylinder having a rear wall 42 and opposed sidewalls 43*a* and 43*b*, with the front-side wall removed from the open first end 46 to the open second end 47, to form the open-sided hollow cylinder. The removed portion of the square cylinder leaves an open slot 45 extending the entire length from the open first end 46 to the open second end 47. When the crank sleeve 20 is placed onto the crank 10, the second open-sided hollow cylinder 40 envelopes the extending arm section 12 of the crank 10, with the opposed sidewalls 43*a* and 43*b* disposed on opposite lateral sides of the arm section 12, and the rear side of the arm section 12 confronting the rear wall 42. The open first end 46 of the second open-sided hollow cylinder 40 is fixed unitarily, for example by welding of iron or steel square cylinders, and at approximately a right angle, to the underside of first open-sided hollow cylinder 30, to provide a continuous right-angled open slot 25 that extends from the open first end 36 of the first open-sided hollow cylinder 30 to the open second end 47 of the second open-sided hollow cylinder 40.

The crank sleeve 10 includes a drive shank 70 as a means for transferring torque delivered by a powered hand drill to rotatively drive the crank sleeve 20, and along with it the attached and secured crane 10, around the axis 101 of the first open-sided hollow cylinder 30. Opposed sidewalls 43*a*, 43*b* of the second open-sided hollow cylinder 40 of the crank sleeve 20 applies lateral force to the respective sides of the arm section 12 of the crank 10, for rotating the crank 10 clockwise or counter-clockwise around the axis 102 of the landing gear drive shaft 6.

Figure 5:
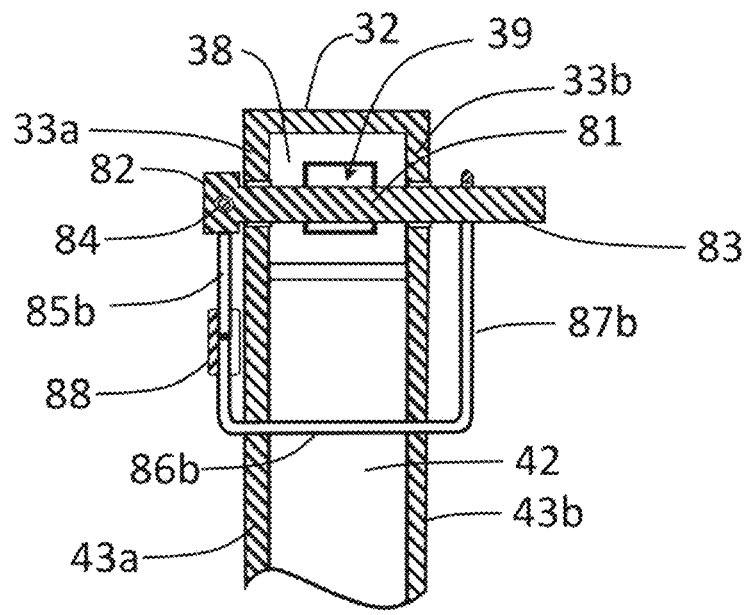
FIG. 5 shows a lateral section view of the crank sleeve, taken along line 5-5 of FIG. 3.
Figure 6:
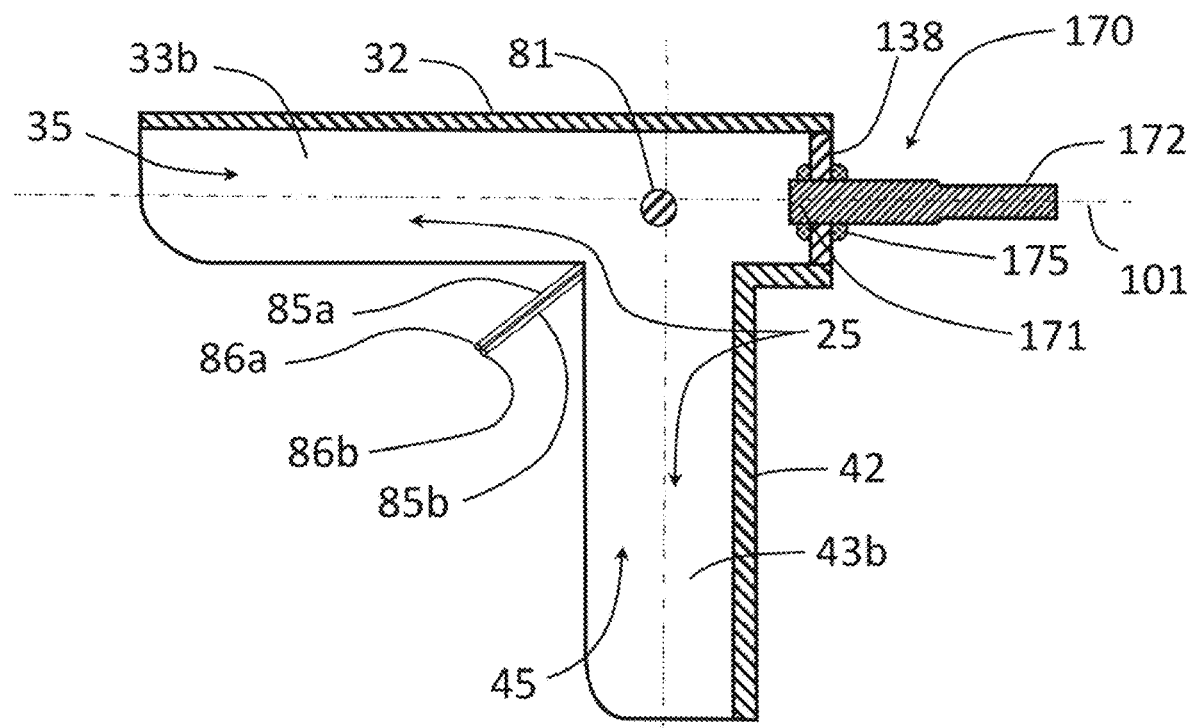
FIG. 6 shows a longitudinal section view of an alternative embodiment of a crank sleeve having a unitary drive shank.

FIGS. 4 and 5 show the drive shank 70 having a drive end 71 and a driven end 72. The driven end 72 can be a convention shank, typically a hexagonal-shaped shank, for insertion and locking into a chuck 92 of a powered hand drill 90. The drive end 71 has a shaped, non-circular cross section, typically a square or other regular polygon, that is configured for insertion into a corresponding-shaped and -sized drive port 39 formed into an end plate 38 that is secured to the second end 37 of, and perpendicular to the axis 101 of, the first open-sided hollow cylinder 30. The drive shank 70 also includes a shoulder 73 that provides a limit to the axial insertion after the drive end 71 has been fully inserted axially into the drive port 39. The shaped drive end 71 prevent relative rotation of the drive shank 70 within the drive port 39, and enables corresponding rotation of the crank sleeve 20 when the drive shank 70 is rotated.

The crank sleeve 20 also includes a means for securing the crank sleeve 20 to the crank 10, to prevent the crank sleeve 20 from slipping or sliding off of the crane 10. FIGS. 4 and 5 show a strap means 80 that retains the hinge section 11 and arm segment 12 of the crank 10 within the continuous open slot 25 of the crank sleeve 20. The strap means 80 includes a wire sling that attaches at opposite ends to a securement on opposite sides of the crank sleeve 20. In the illustrated embodiment, a strap pin 81 extends through aligned holes in the opposed sidewalls 33*a*, 33*b* of the first open-sided hollow cylinder 30, at approximately the intersection of the axis 101 of the first open-sided hollow cylinder 30 and the axis 103 of the second open-sided hollow cylinder 40. A cap 82 at one end of the strap pin 81 prevents the pin from pulling through the hole in the sidewall 33*a*, and an opposite distal end 83 of the strap pin 81 extends through and beyond the opposite sidewall 33*b*. The cap 82 also include a through hole 84 formed transverse the length of the strap pin. The wire sling is a typically a continuous resilient metal wire that is threaded through the through hole 84 and is bent into segments 85*a*, 85*b* that extend away from the cap 82, lateral segments 86*a*, 86*b* that extend laterally to the opposing side of the crank sleeve 20, and a pair of looped segments 87 that extends from the lateral segments 86*a*, 86*b* to a loop 89 that can be extended over the distal end 83 of the strap pin 81. The opposite ends of the resilient metal wire can be fixed together with a retainer 88.

Figure 7:
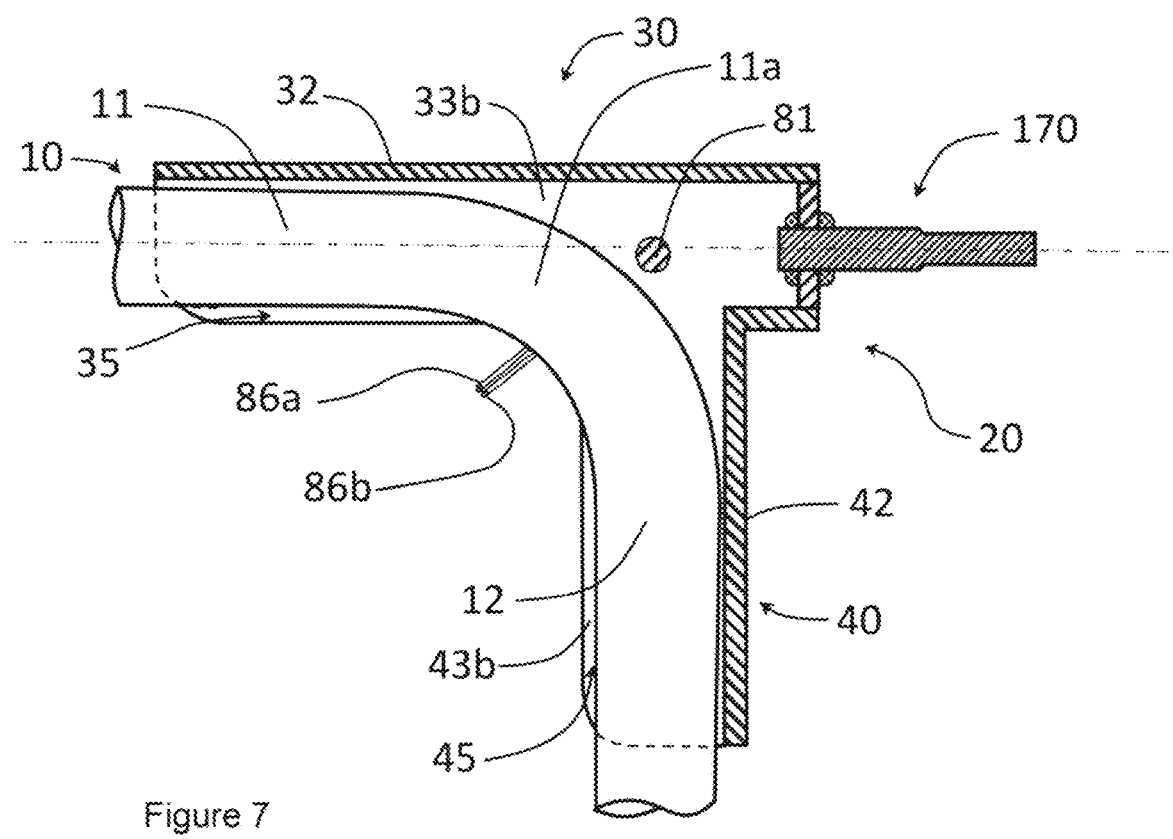
FIG. 7 shows a longitudinal section view of the crank sleeve of FIG. 6 showing the tubing of the crank enveloped by the crank sleeve.
Figure 8:
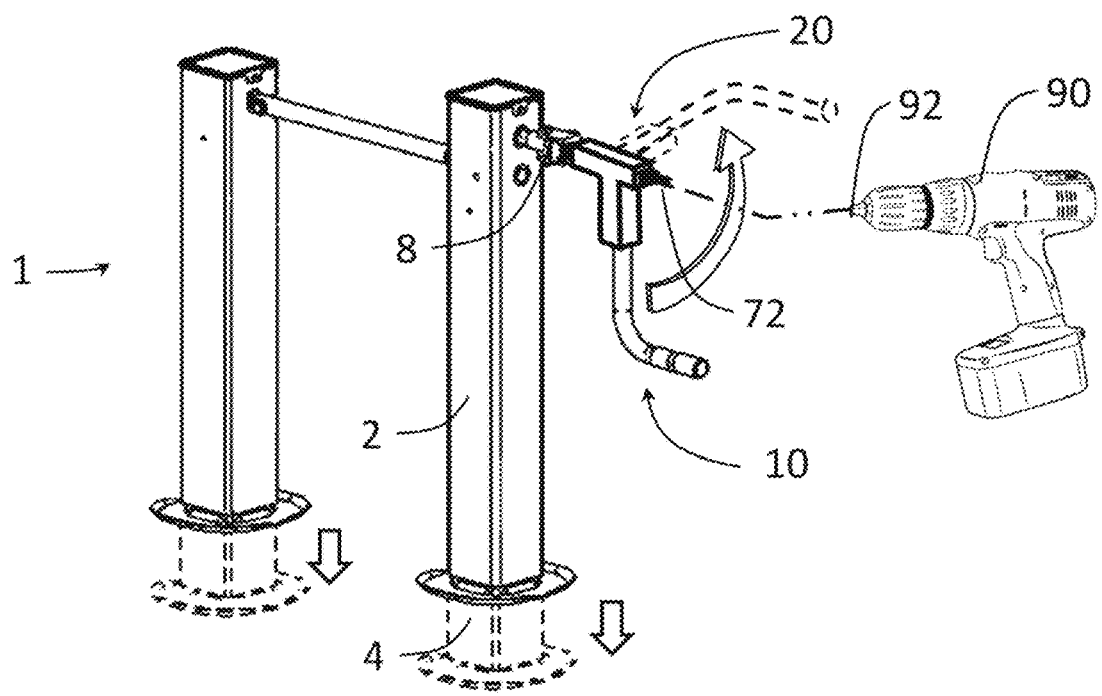
FIG. 8 shows the landing gear assembly and the crank sleeve driven by a powered hand drill.

As shown in FIG. 7, the lateral segments 86a, 86b of the wire sling extend under the curved joint 11a of the crank to prevent the crank sleeve 20 from pulling away from the crank 10. FIG. 8 illustrates using the crank sleeve 20 secured to the crank 10, and the use of a powered hand drill 90. The chuck 92 of the drill 90 is attached to the driven end 72 of the crank sleeve 20. Grasping the drill 90, the operator can operate the drill 90 to rotate the crank sleeve 90 either clockwise or counterclockwise around the axis 101. The drill 90 can also be operated at either high speed or low speed, as needed.

Figure 9:
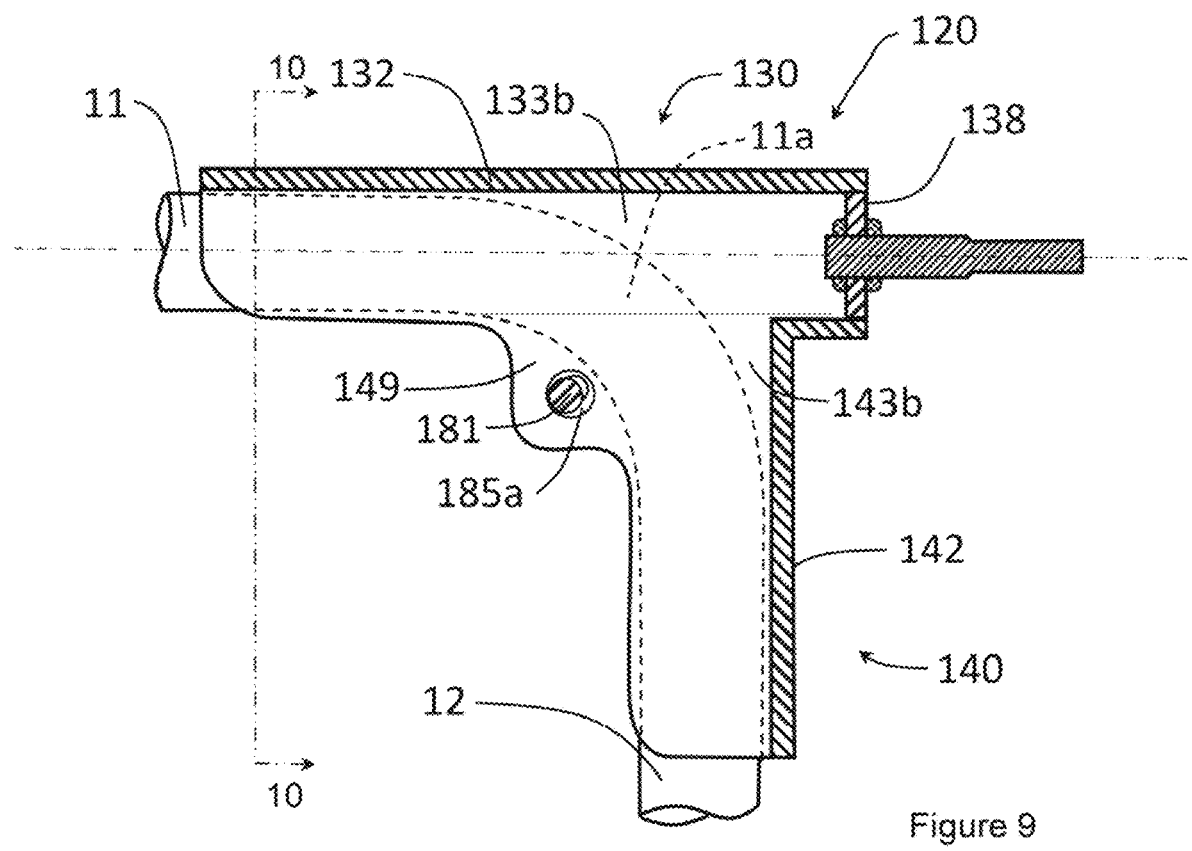
FIG. 9 shows an alternative embodiment of a crank sleeve and means for securing the crank sleeve to a crank.
Figure 10:
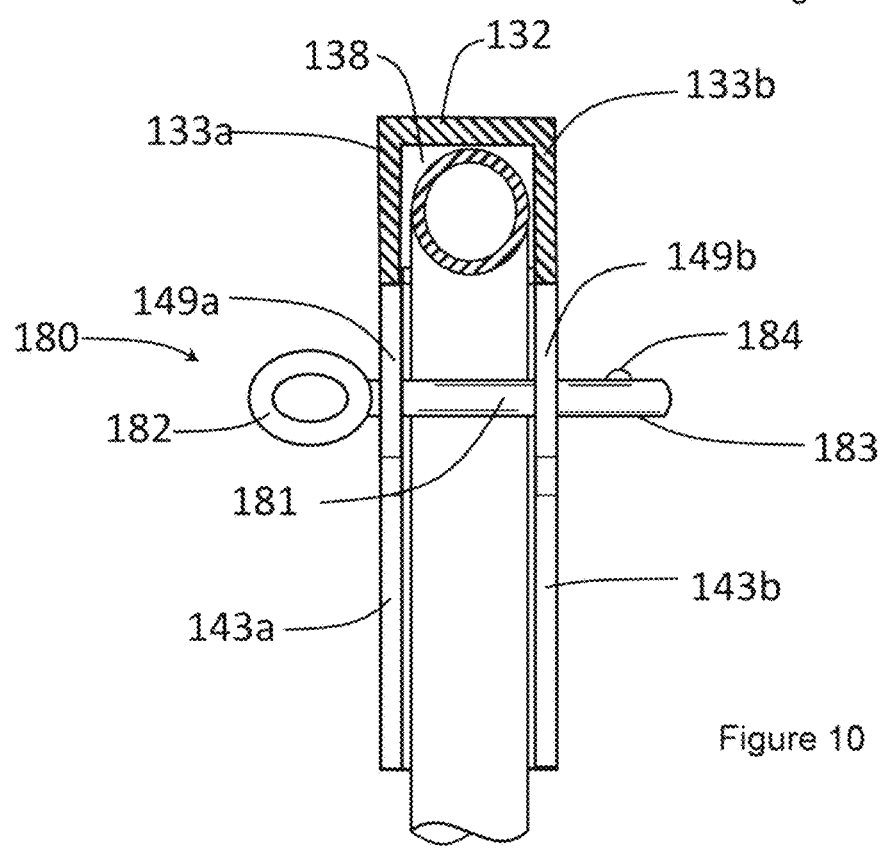
FIG. 10 shows a lateral section view of the crank sleeve taken along line 10-10 of FIG. 9.

FIGS. 9 and 10 illustrate an alternative embodiment of a crank sleeve 120, in which the sidewalls of the first open-sided hollow cylinder 130 and/or the second open-sided hollow cylinder 140 extend outwardly to an extended region 149, from the respective top wall 132 of the first open-sided hollow cylinder 30 or rear wall 142 of the second open-sided hollow cylinder 140, in the area of the juncture of the first open-sided hollow cylinder 130 and the second open-sided hollow cylinder 140. The region 149 extends beyond and envelopes the curved joint 11a of the crank 10. A means for securing the crank sleeve 120 to the crank 10 includes a removable securement 180 having an elongated pin 81 that extends between and through aligned holes in opposed sidewalls 149a, 149b in the extended region 149, and under the curved joint 11a of the crank 10, to prevent the crank sleeve 20 from pulling away from the crank 10. A grasping means illustrated as a ring 182 or other graspable member at one end of the elongated pin 81 prevents the pin 81 from pulling through a first hole 185a in the sidewall 149a, and an opposite distal end 183 of the strap pin 81 includes a releasable securement. In the illustrated embodiment, the releasable securement is a depressible, spring-loaded detent ball 184 that blocks and inhibits the elongated pin 181 from being slid through a second hole 185b in the sidewall 149b with less than a significant force. The second hole 185b is sized to accommodate the size/diameter of the elongated pin 181, though is smaller in size than both the pin and the detent ball 184. The pin 81 can be easily withdrawn by depressing the detent ball 184 into the pin 181 while drawing the pin 181 and detent ball 184 through the second hole 185b. The first hole 185a in the sidewall 149a is sized to allow the detent ball 184 to be pulled through without needing to depress the detent ball 184.

Figure 11:
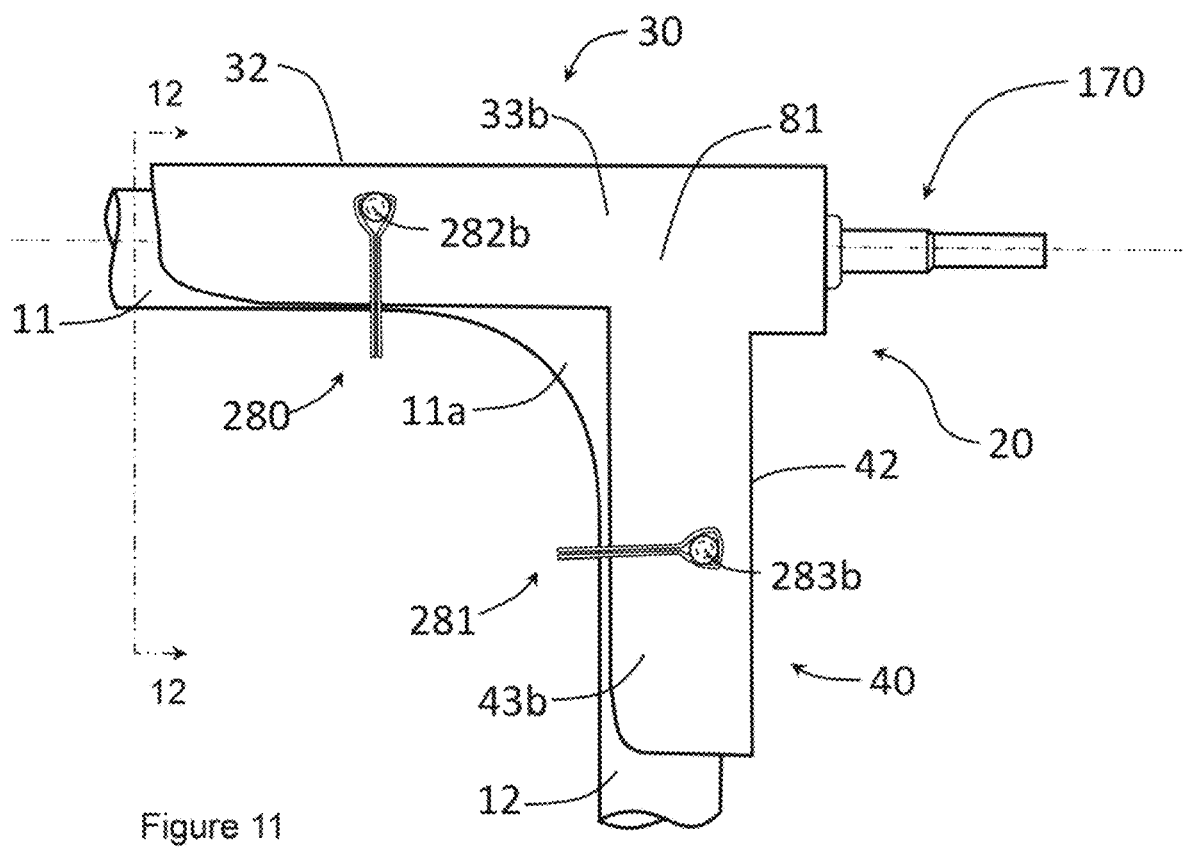
FIG. 11 shows an alternative embodiment of means for securing a crank sleeve to a crank.
Figure 12:
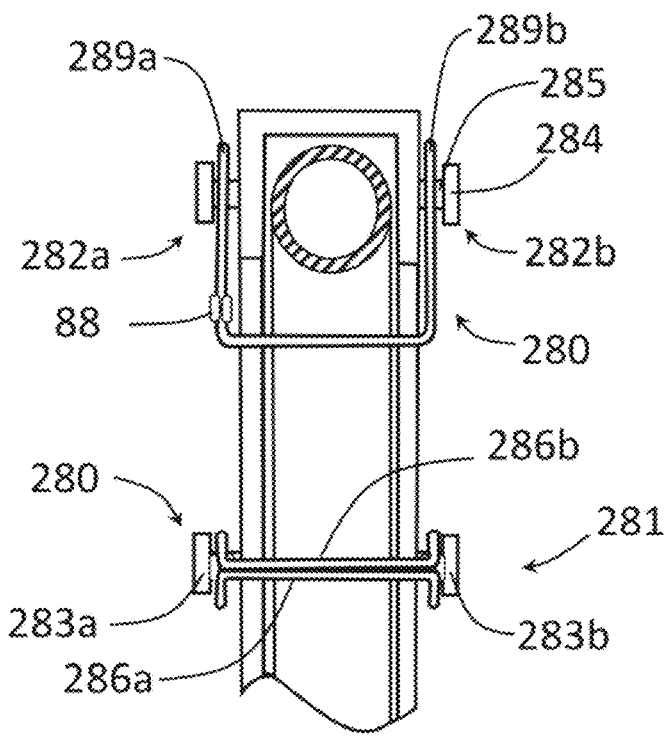
FIG. 12 shows a lateral section view of the crank sleeve taken along line 12-12 of FIG. 11.

FIGS. 11 and 12 show an alternative embodiment of a strap as a means for securing the crank sleeve to the crank, for illustration purposes shown as the crank sleeve 20. A first strap means 280 is affixed to the first open-sided hollow cylinder 30 with a first wire sling that has intermediate wire segments 286a, 286b that secure under the outer surface of the hinge section 11 of the crank 10, and a second strap means 281 is affixed to the second open-sided hollow cylinder 40 with a second wire sling has intermediate wire segments 286a, 286b that secure around the outer surface of the arm section 12 of the crank 10. Each wire sling has opposed end loops 289a and 289b that loop over the opposed posts on opposite sides of the crank sleeve 20. A first pair of posts 282a and 282b are fixed to and extend laterally from opposite sidewalls 33a, 33b of the first open-sided hollow cylinder 30. A second pair of posts 283a and 283b are fixed to and extend laterally from opposite sidewalls 43a, 43b of the second open-sided hollow cylinder 40. Each post includes a stem 285 extending from the respective sidewall, and a cap 284. Each respective loop 289a, 289b is fitted over the cap 284 and hooked to the stem 285, captured by the cap 284. Intermediate wire segments 286a, 286b are lateral segments of the wire sling that restrain the crank sleeve 20 in engagement with the crank 10. The wire sling is a typically a continuous resilient metal wire with opposite ends of the resilient metal wire fixed together with a retainer 88.

FIGS. 13-17 illustrate another embodiment of a crank sleeve 220. The crank sleeve 220 is functionally similar to the previously-described crank sleeve 20. In the illustrated embodiment, The first open-sided hollow cylinder and second open-sided hollow cylinder are embodied as an single unitary open-sided hollow cylinder having a hinge segment, an arm segment, and an intermediate curved segment.

The hinge segment includes a laterally semi-circular hinge segment 232a, and a pair of opposed sidewalls 233a, 233b extending in parallel from the opposite edges of the semi-circular hinge segment 232a, to form an open-sided hinge segment. The hinge segment 232a is formed from a circular cylindrical wall with a chord portion of the cylinder wall removed, typically a chord of about 180 degrees (or half tube). The arm segment includes a laterally semi-circular arm segment 232b, and a pair of opposed sidewalls 234a, 234b extending in parallel from the opposite edges of the semi-circular arm segment 232b, to form an open-sided arm hinge segment. Like the hinge segment, the arm segment 232b is formed from a circular cylindrical wall with a chord portion of the cylinder wall removed, typically a chord of about 180 degrees. The intermediate curved segment includes a laterally semi-circular intermediate segment 232c that extends longitudinally from a distal end of the hinge segment 232a to a proximal end of the arm segment 232b, and a pair of opposed sidewalls 235a, 235b extending in parallel from the opposite edges of the semi-circular segment 232c, to form an open-sided intermediate segment. Like the hinge segment and the arm segment, the intermediate segment 232c is formed from a circular cylindrical wall with a chord portion of the cylinder wall removed, typically a chord of about 180 degrees.

The respective opposed edges and opposed sidewalls of the hinge, intermediate, and arm segments form enveloping walls that form and define a continuous open-side interior along the entire length of the crank sleeve 220.

Figure 13:
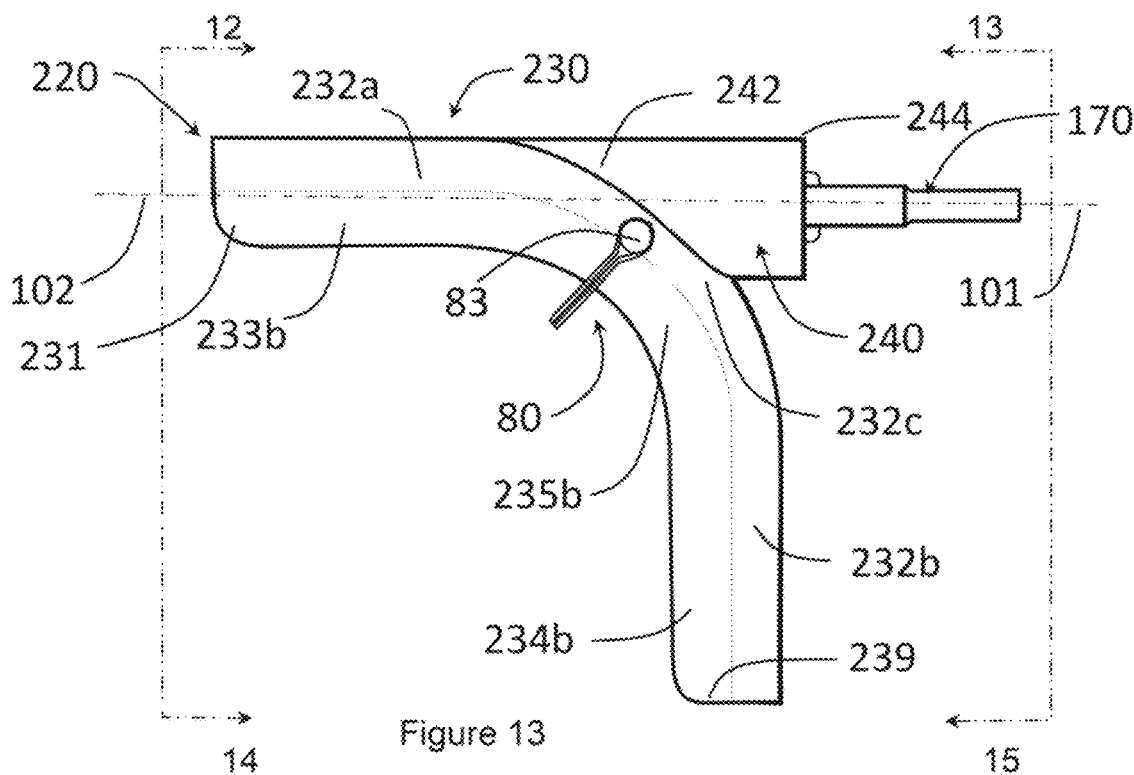
FIG. 13 shows another embodiment of a crank sleeve.
Figure 15:
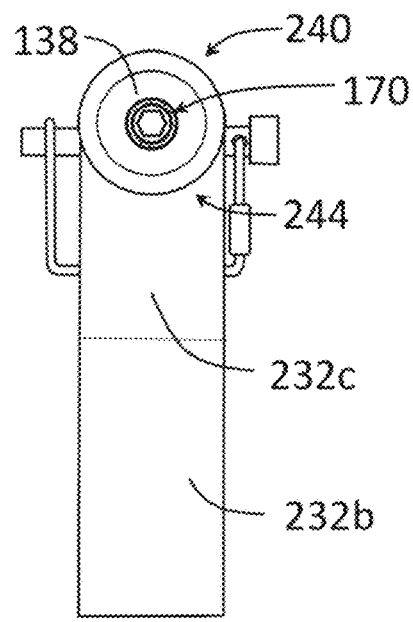
FIG. 15 shows rear elevation view of the crank sleeve of FIG. 13.
Figure 16:
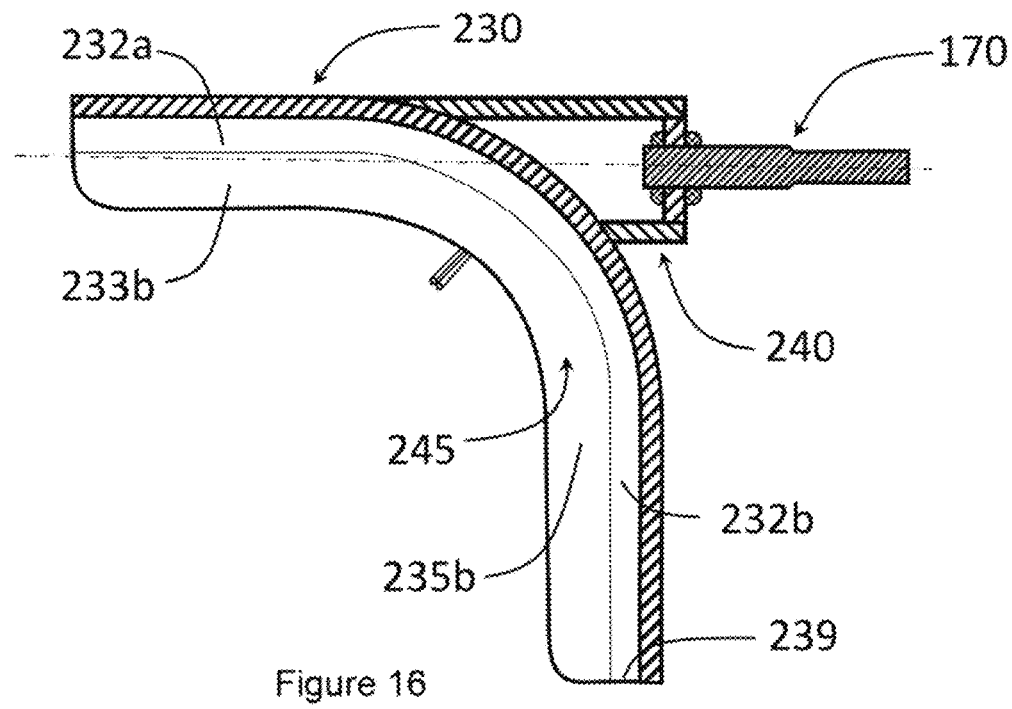
FIG. 16 shows a longitudinal section view of the crank sleeve taken along line 16-16 of FIG. 14.

FIG. 13 shows a side elevation view, and FIG. 16 shows an axial sectional view, of the crank sleeve 220, which also includes a circular extension cylinder 240 having an axis that extends in parallel, and in certain embodiments, coaxial, to an axis of the hinge segment. The extension cylinder 240 has a forward end 242 that has a periphery congruent with the outer rear surface of the intermediate segment 232c, and is attached securely, typically welded, to the intermediate segment 232c, to form a unitary crank sleeve 220. The rear end 244 of the extension cylinder 240, as shown in FIG. 15, includes a rear wall 138 attached securely, typically welded, to the rear end 244 of the intermediate segment 232c. A drive shank 170 is fixed into the rear wall 138, at the rear end 244 of the intermediate segment 232c of the crank sleeve 220, and extending along an axis 101, which is parallel, and in preferred embodiments, coaxial, to the axis of the extension cylinder 240 and the hinge segment 230 of the crank sleeve 220.

Figure 14:
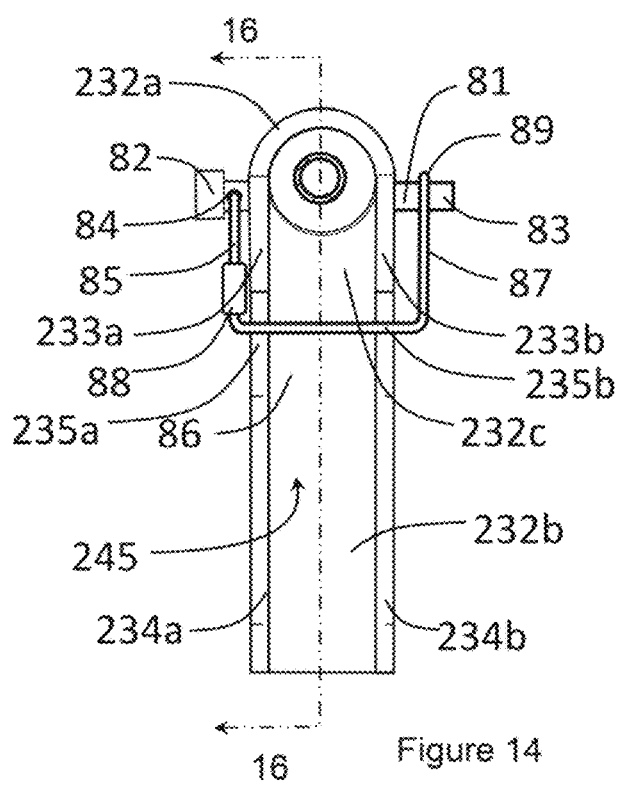
FIG. 14 shows front elevation view of the crank sleeve of FIG. 13.

FIG. 14 shows a front elevation view of the crank sleeve 220, facing the hinge segment 230, and showing the continuous open slot 245 from the open first end 231 of the hinge segment 232a to the open second end 239 of the arm segment 232b.

Figure 17:
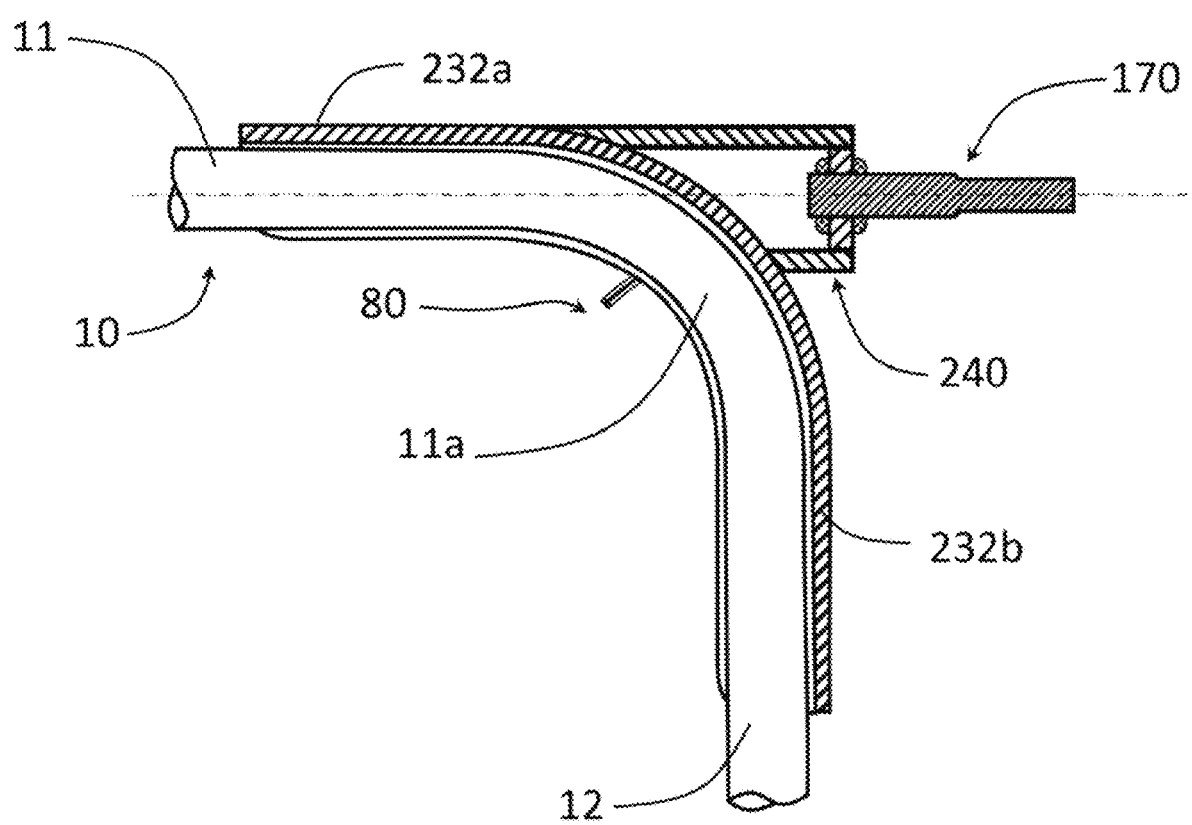
FIG. 17 shows a longitudinal section view of the crank sleeve of FIG. 16 showing the tubing of the crank enveloped by the crank sleeve.

FIG. 17 shows the axial sectional view of the crank sleeve 220 applied to, and preferably secured to, a crank 10. The curved joint 11a of the crank 10 nests within the continuous open slot 245 of the crank sleeve 220. The diameter of the inner surface of the semi-circular cylinder of the circular cylinder 230 is typically larger than the outer diameter of the tube sections of the crank 10.

I claim:

1. A crank sleeve, including:
   a first open-sided hollow cylinder having a length, an open first end, and a second end, and having an open slot extending from the open first end along the length toward the second end, and having an axis along the length,
   a second open-sided hollow cylinder having a length, an open first end, and an open second end, and having an open slot extending from the open first end along the length toward the open second end, the second end of the first open-sided hollow cylinder fixed at a right angle to the open second end of the second open-sided hollow cylinder, to provide a continuous open slot from the open first end of the first open-sided hollow cylinder to the open first end of the second open-sided hollow cylinder, and
   a drive port formed into an end plate which is secured at the second end of, and oriented perpendicular to the axis of, the first open-sided hollow cylinder, and configured for inserting therein a drive shank that extends along the axis of the first open-sided hollow cylinder.

2. A crank sleeve, including:
   a first open-sided hollow cylinder having a length, an open first end, and a second end, and having an open slot extending from the open first end along the length toward the second end, and having an axis along the length,
   a second open-sided hollow cylinder having a length, an open first end, and an open second end, and having an open slot extending from the open first end along the length toward the open second end, the second end of the first open-sided hollow cylinder fixed at a right angle to the open second end of the second open-sided hollow cylinder, to provide a continuous open slot from the open first end of the first open-sided hollow cylinder to the open first end of the second open-sided hollow cylinder, and
   a drive shank fixed at the second end of, and extending along the axis of, the first open-sided hollow cylinder.

3. The crank sleeve according to claim 1, wherein each of the first open-sided hollow cylinder and the second open-sided hollow cylinder is a square cylinder with one wall removed, or a circular cylinder with a chord portion of the cylinder wall removed.

4. The crank sleeve according to claim 2, wherein each of the first open-sided hollow cylinder and the second open-sided hollow cylinder is a square cylinder with one wall removed, or a circular cylinder with a chord portion of the cylinder wall removed.

5. The crank sleeve according to claim 1, wherein the crank sleeve further includes a means for securing the crank sleeve to a crank, to prevent the crank sleeve from slipping or sliding off of the crank, selected from the group consisting of:
   (a) a strap means including a wire sling that attaches at opposite ends to a securement on opposite sides of the crank sleeve,
   (b) an extended region of each of the first open-sided hollow cylinder and the second open-sided hollow cylinder, extend outwardly beyond a curved joint of the crank, and a removable securement having an elongated pin that extends between and through aligned holes in opposed sidewalls in the extended region, and
   c) a strap means for securing the crank sleeve to the crank, comprising a first strap means affixed to the first open-sided hollow cylinder with a first wire sling having intermediate wire segments that secure under the outer surface of the hinge section of the crank, and a second strap means affixed to the second open-sided hollow cylinder with a second wire sling having intermediate wire segments that secure around the outer surface of the arm section of the crank.

6. The crank sleeve according to claim 2, wherein the crank sleeve further includes a means for securing the crank sleeve to a crank, to prevent the crank sleeve from slipping or sliding off of the crank, selected from the group consisting of:
   (a) a strap means including a wire sling that attaches at opposite ends to a securement on opposite sides of the crank sleeve,
   (b) an extended region of each of the first open-sided hollow cylinder and the second open-sided hollow cylinder, extend outwardly beyond a curved joint of the crank, and a removable securement having an elongated pin that extends between and through aligned holes in opposed sidewalls in the extended region, and
   c) a strap means for securing the crank sleeve to the crank, comprising a first strap means affixed to the first open-sided hollow cylinder with a first wire sling having intermediate wire segments that secure under the outer surface of the hinge section of the crank, and a second strap means affixed to the second open-sided hollow cylinder with a second wire sling having intermediate wire segments that secure around the outer surface of the arm section of the crank.

* * * * *